United States Patent
Byerley (10) Patent No.: US 9,723,354 B2
(45) Date of Patent: Aug. 1, 2017

(54) WIRELESS TUNER SHARING

(71) Applicant: EchoStar Technologies L.L.C., Englewood, CO (US)

(72) Inventor: Seth A. Byerley, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 233 days.

(21) Appl. No.: 14/032,697

(22) Filed: Sep. 20, 2013

(65) Prior Publication Data

US 2015/0089536 A1 Mar. 26, 2015

(51) Int. Cl.
*H04N 7/18* (2006.01)
*H04N 21/426* (2011.01)
*H04N 21/436* (2011.01)
*H04N 21/45* (2011.01)
*H04N 21/258* (2011.01)
*H04N 21/438* (2011.01)

(52) U.S. Cl.
CPC ... *H04N 21/4263* (2013.01); *H04N 21/25816* (2013.01); *H04N 21/4383* (2013.01); *H04N 21/43615* (2013.01); *H04N 21/4532* (2013.01)

(58) Field of Classification Search
CPC .................. H04N 21/4263; H04N 21/43615
USPC .................................................... 725/28, 82
See application file for complete search history.

(56) References Cited

U.S. PATENT DOCUMENTS

| | | | |
|---|---|---|---|
| 8,752,103 B2 * | 6/2014 | Mukerji et al. ................. 725/95 |
| 8,910,231 B2 * | 12/2014 | White ..................... H04N 7/163 |
| | | | 705/14.36 |
| 9,038,102 B1 * | 5/2015 | Gopinath ........... H04N 21/4788 |
| | | | 725/11 |
| 9,301,019 B1 * | 3/2016 | Arini ................ H04N 21/25841 |
| 9,414,031 B2 * | 8/2016 | Newell ................... H04N 7/162 |
| 2002/0199205 A1 * | 12/2002 | Sonawane et al. ........... 725/115 |
| 2003/0118014 A1 * | 6/2003 | Iyer et al. ..................... 370/389 |
| 2004/0181814 A1 * | 9/2004 | Ellis et al. ..................... 725/134 |
| 2005/0135366 A1 * | 6/2005 | Trappeniers et al. ......... 370/390 |
| 2009/0025027 A1 * | 1/2009 | Craner ............................ 725/32 |
| 2010/0115540 A1 * | 5/2010 | Fan ................... H04N 21/25816 |
| | | | 725/1 |
| 2011/0162018 A1 * | 6/2011 | Dodd .................. H04N 21/4333 |
| | | | 725/78 |
| 2012/0317605 A1 * | 12/2012 | Brogan ......................... 725/109 |
| 2013/0024901 A1 * | 1/2013 | Sharif-Ahmadi et al. .... 725/114 |
| 2016/0029098 A1 * | 1/2016 | Fogelson ............. H04N 21/252 |
| | | | 725/14 |

(Continued)

*Primary Examiner* — Pankaj Kumar
*Assistant Examiner* — Sahar Baig
(74) *Attorney, Agent, or Firm* — Bejin Bieneman PLC (57) ABSTRACT

A system includes a server in communication with a first set top box and a second set top box. The server receives a request from the first set top box to access an available tuner of the second set top box, accesses account information associated with the first set top box, and commands the second set top box to stream content from the available tuner to the first set top box according to the account information. A method includes identifying available tuners of set top boxes assigned to different customers, receiving a request from a first set top box to access an available tuner of a second set top box, accessing account information associated with the first set top box, and commanding the second set top box to stream content to the first set top box according to the account information of the first set top box.

20 Claims, 4 Drawing Sheets

(56) References Cited

U.S. PATENT DOCUMENTS

2016/0191147 A1* 6/2016 Martch .............. H04B 7/18526
    725/5
2016/0316248 A1* 10/2016 Hao ................. H04N 21/41407

* cited by examiner

WIRELESS TUNER SHARING

BACKGROUND

Set top boxes receive some media content, such as television programming, program information, and on-demand content, through a tuner. Many set top boxes have multiple tuners so that content subscribers can watch or record content on one tuner while simultaneously recording content on another tuner. Competition for available tuners within a household can arise when the set top box has fewer tuners than household members, especially if the household members have different content viewing preferences. Moreover, a limited number of tuners can prevent content subscribers from watching television content, downloading on-demand content, and fetching program guide information if all of the tuners are in use.

DETAILED DESCRIPTION

An exemplary system includes a content server in communication with multiple set top box receivers, including a first set top box and a second set top box. The server receives a request from the first set top box to access an available tuner of the second set top box, accesses account information associated with the first set top box, and commands the second set top box to stream content from the available tuner to the first set top box according to the account information of the first set top box.

An exemplary method includes identifying available tuners of set top boxes assigned to different customers, receiving a request from a first set top box to access an available tuner of a second set top box, accessing account information associated with the first set top box, and commanding the second set top box to stream content to the first set top box according to the account information.

An exemplary set top box includes a device manager that can identify at least one other set top box able to receive content over a communication network and a tuner discovery module that can determine whether the at least one other set top box has an available tuner. The set top box further includes a processing device that transmits account information to a service provider over the communication network and requests content to be streamed from the available tuner of the other set top box. A network interface device may either start streaming the content from an internal tuner or receive the content streamed from the available tuner of the other set top box. The content is streamed according to account information associated with the account information that is obtained from the content server and is transmitted by the processing device.

Figure 1:
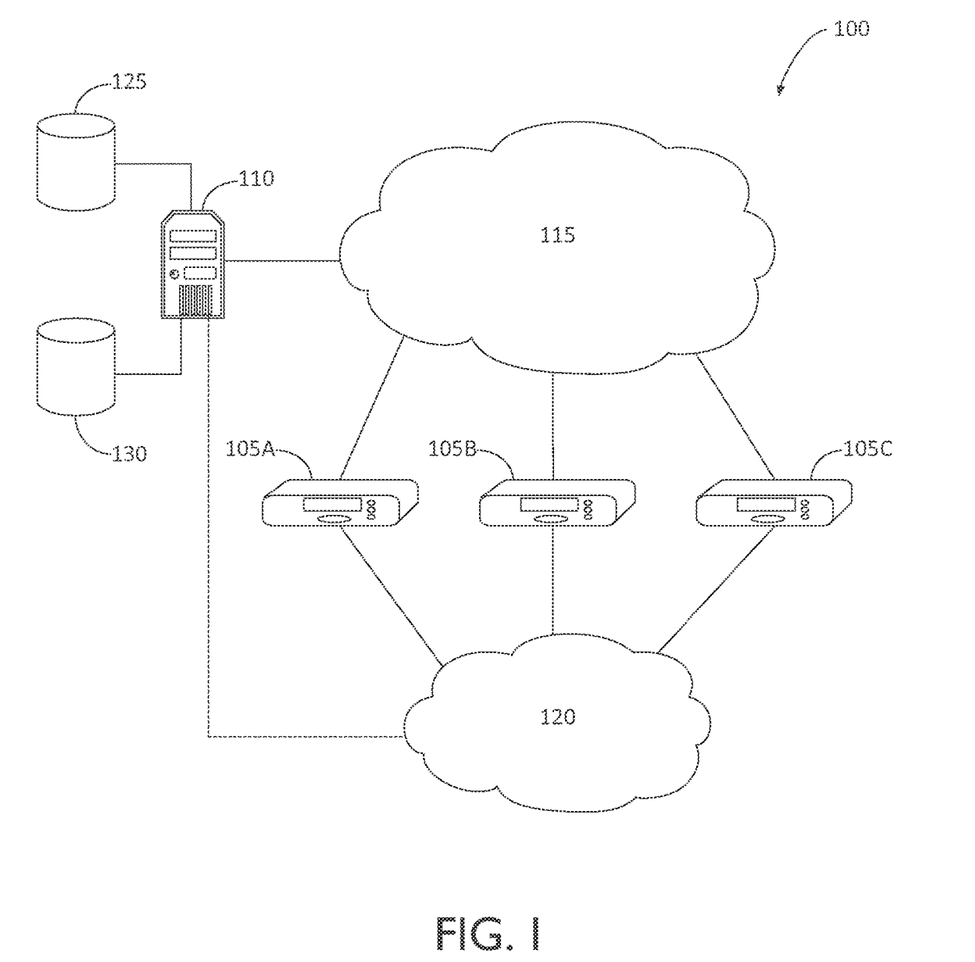
FIG. 1 illustrates an exemplary system for sharing tuners among set top boxes.

FIG. 1 illustrates an exemplary system 100 for sharing tuners among set top boxes. The system may take many different forms and include multiple and/or alternate components and facilities. While an exemplary system is shown, the exemplary components illustrated are not intended to be limiting. Indeed, additional or alternative components and/or implementations may be used.

As illustrated in FIG. 1, the system 100 includes set top boxes 105 and a content server 110 able to communicate over a content provider network 115. The set top boxes 105 may communicate with one another, and in some instances with the content server 110, over a content sharing network 120.

Each set top box 105 may be configured to receive media content, such as television shows and movies, video-on-demand content, program information, games, Internet content, etc., through the content provider network 115. Moreover, each set top box 105 may be configured to identify other set top boxes 105 able to transmit and receive signals over the content sharing network 120. As discussed in greater detail below with regard to FIG. 2, each set top box 105 may include various components that allow the set top box 105 to receive media content via the content provider network 115 and transmit the content to another set top box 105 over the content sharing network 120. Likewise, each set top box 105 may be able to receive content over the content sharing network 120 from another set top box 105. Only three set top boxes 105 are shown in FIG. 1 for simplicity. The system 100 may include any number of set top boxes 105, however.

Each set top box 105 may be configured determine whether it has a tuner available (i.e., not currently in use) and transmit a message indicating the availability of one or more tuners to the content server 110. The message indicating the availability of one or more tuners may be transmitted to the content server 110 automatically if one or more of the predetermined conditions occur. Examples of predetermined conditions may include whether a television connected to the set top box 105 is turned off, fewer than all of the tuners are recording media content or receiving video-on-demand content, or program information at a particular time, or at least one tuner is considered idle or not being used in any other way. By way of example only, the set top box 105 may determine that all tuners are available when the set top box 105 is idle with no tuners being used locally or remotely by another set top box 105. If the set top box 105 is not idle and, e.g., one or more shows are recording, the set top box 105 is being used for watching television, downloading video-on-demand content, downloading program information, or is being used remotely by another set top box 105 on the network, the set top box 105 may determine that the remaining tuners, if any, are available for sharing.

The set top box 105 may also or alternatively be configured to determine whether a tuner is available based on a user input commanding the set top box 105 to make a tuner available or permitting tuners to become available if any one or more of the predetermined conditions exist. The user input may further specify how long the tuner is to remain available by designating a particular amount of time (e.g., 30 minutes). When that time lapses, the set top box 105 may disable the sharing of the available tuner. Another user input may indicate that user no longer wishes for a previously available tuner to be available to others in which case the set top box 105 may transmit a message to the content server 110 requesting that all sharing of the tuner stop immediately. When the set top box 105 that is streaming one of its tuners remotely to another set top box 105 needs to use one of its tuners locally due to reasons such as the user taking the set top box 105 out of idle state or a recording starting, etc., the tuner will become available locally and the set top box 105 that is receiving the tuner streaming content will be notified that the tuner was lost in which case the set top box 105 that was using the shared tuner may find another tuner on another set top box 105 to use for streaming.

In some possible implementations, the set top box 105 may be configured to estimate how long the tuner will be available based on when the next predetermined condition is scheduled to occur. For example, the set top box 105 may estimate that a tuner that is currently available but will become unavailable when the tuner is needed to record a scheduled program. The set top box 105 may be configured to communicate the estimate to the content server 110.

The content server 110 may be configured to provide requested media content to one or more set top boxes 105 via the content provider network 115. The content server 110 may receive the request for media content, access the media content from an electronic storage location, and stream the media content to the set top box 105 that requested the media content to a shared tuner of another set top box. The content server 110 may determine the electronic storage location of the requested media content by querying a content database 125. The electronic storage location may include a memory location of the content server 110 or any other server or memory device accessible to the content server 110. While only one content server 110 and one content database 125 are shown, the system 100 may include any number of content servers 100 and content databases 125.

The content server 110 may be further configured to access account information associated with one or more of the set top boxes 105 by querying an account database 130. The account information may include a subscriber name, address, a set top box identifier, and subscription details associated with the set top box 105. The subscription details may define the media content, including channels, video-on-demand, etc., the set top box 105 may access through the content provider network 115. In some instances, the content server 110 may provide media content consistent with the subscription details associated with the set top box 105 that requested the media content. Moreover, the account information may include sharing preferences that define, for example, whether one or more tuners of the set top box 105 are available for sharing with another set top box 105. The account information may be unique or substantially unique to each set top box 105, especially if assigned to different customers of the service provider. Some set top boxes 105 may be associated with the same subscription details while others may be associated with different subscription details.

The content server 110 may receive a request from one set top box 105A (a "first" set top box) to access an available tuner of another set top box 105B (a "second" set top box) and transmit the requested content to the second set top box 105B if the requested media content is within the scope of the account information, and in particular the subscription details, associated with the first set top box 105A. In response to receiving, from the first set top box 105A, a request to access the available tuner of the second set top box 105B, the content server 110 may query the account database 130 for the account information associated with the first set top box 105A and verify that the first set top box 105A has permission to access the requested media content.

The media content may be streamed to the first set top box 105A until the tuner of the second set top box 105B is no longer available for streaming media content. The content server 110 may, in some instances, be configured to identify a different set top box 105C (a "third" set top box 105) as having an available tuner when the tuner of the second set top box 105B becomes unavailable. In such instances, the content server 110 may send the media content to the third set top box 105C and command the third set top box 105C to stream the media content to the first set top box 105A.

The content server 110 may be configured to determine whether any of the set top boxes 105 have an available tuner based on communications from each set top box 105. The content server 110 may receive an explicit asynchronous communication that a tuner is available or may receive a message indicating that one or more predetermined conditions has occurred. As discussed above, examples of predetermined conditions may include whether the set top box 105 transitions from an idle to a non-idle state, whether fewer than all of the tuners are recording media content or receiving video-on-demand content at a particular time, or whether at least one tuner is not being used in any other way. The content server 110 may receive messages concerning tuner availability over either the content provider network 115, the content sharing network 120, or any other communication network.

In some possible approaches, the content server 110 may be configured to determine or estimate how long a tuner will likely remain available based on a communications from the set top box 105 sharing the tuner or based on when the next predetermined condition of the set top box 105 is likely to occur. For instance, the content server 110 may access a recording schedule of the set top box 105 and may estimate that the tuners of a particular set top box 105 may only be available until the next scheduled recording. Alternatively or in addition, the content server 110 may determine how long the tuner will be available based upon a user input provided to the set top box 105 and communicated to the content server 110. Once the tuner is no longer available, the content server 110 may stop providing media content to the set top box 105 for sharing across the content sharing network 120.

In some implementations, the set top box 105 may perform one or more actions described above for the content server 110. That is, the set top box 105A requesting the streaming content may determine which other set top boxes 105 have an available tuner, determine or estimate how long the shared tuner will be available, etc., while the content server 110 may authenticate the account information of the set top box 105A requesting the streaming content.

The content provider network 115 may include any network infrastructure that can provide media content from the content server 110 to one or more set top boxes 105. The content provider network 115 may include a satellite communication network, a cellular network, a cable network, wireless network, a packet-switched network, or the like. The infrastructure, therefore, may include satellites, satellite dishes, antennas, cell towers, cables such as fiber optic cables, Ethernet cables, coaxially cables, wireless USB device, and/or any other hardware that can be used to convey the media content from the content server 110 to one or more of the set top boxes 105. In some possible implementations, the content provider network 115 may include multiple network types (e.g., a satellite communication network and a packet-switched network).

The content sharing network 120 may include any infrastructure that can allow set top boxes 105 to share media content with one another. For instance, the content sharing network 120 may allow content received at one set top box 105 via the content provider network 115 to be streamed to another set top box 105. The content sharing network 120 may further permit communication between the set top boxes 105 and the content server 110. The content sharing network 120 may include any telecommunications network including a packet-switched network. In some possible approaches, the content sharing network 120 may include multiple network types (e.g., a satellite communication network and a packet-switched network). The content sharing network 120 may include a public network available to all compatible devices and/or a private network available only to particular set top boxes 105 having certain characteristics such as set top boxes 105 within a certain geographic region (e.g., a neighborhood, a municipality, a state, a country, etc.) and/or set top boxes 105 associated with a particular content provider.

In general, computing systems and/or devices, such as the set top boxes 105 and the content server 110, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, HTML, XML, JSON, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
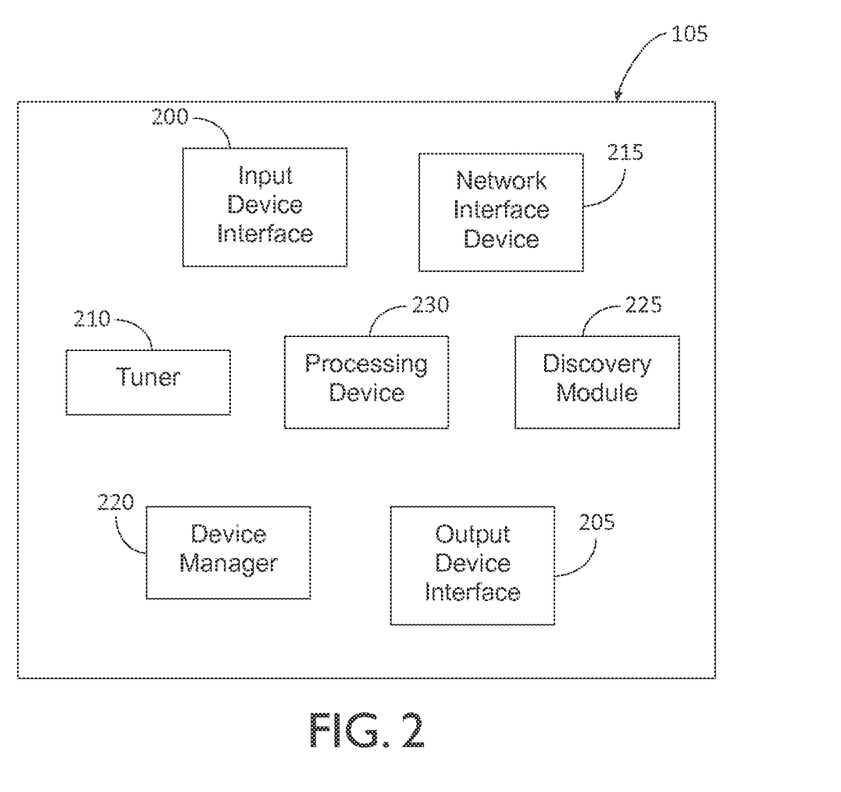
FIG. 2 is a block diagram showing some components of an exemplary set top box.

FIG. 2 is a block diagram illustrating components of an exemplary set top box 105. The set top box 105 may include an input device interface 200, an output device interface 205, a tuner 210, a network interface device 215, a device manager 220, a tuner discovery module 225, and a processing device 230. The set top box 105 may include additional or fewer components than those shown and discussed based on the features and/or capabilities of the set top box 105.

The input device interface 200 may be configured to receive commands and other types of inputs from, e.g., a remote control (not shown) operated by a user of the set top box 105. The input device interface 200 may include an infrared port, a keyboard, a mouse, or any other device or combination of devices that allow the set top box 105 to receive user inputs.

The output device interface 205 may be configured to show information, media content, or both, to a user of the set top box 105 through an external device such as a television. The output device interface 205 may include any audio/video interface such as a high-definition multimedia interface (HDMI), a digital visual interface (DVI), a video graphics array (VGA) interface, or any other interface capable of converting signals received over the content provider network 115 and/or content sharing network 120 into media content for the user to watch on a television, computer, mobile device, or any other device for consuming media content.

The tuner 210 may be configured to receive signals over the content provider network 115 and convert the received signals into media content to be consumed by the user. The tuner 210 may be configured to receive signals transmitted over the content provider network 115 and output the decoded signals to the output device interface 205 for presentation to the user. For example, the tuner 210 may include a Direct Broadcast Satellite (DBS) tuner. In some instances, the tuner 210 may be configured to decode the signals communicated over the content provider network 115 into audio and video signals that can be output to the output device interface 205 and ultimately shown on the television as sound and picture.

The network interface device 215 may be configured to facilitate communication over the content sharing network 120. Thus, the network interface device 215 may be configured to transmit and receive signals transmitted over one or more telecommunications networks, such as a packet-switched network. The network interface device 215 may be configured for WiFi, Ethernet, or other types of communication. The network interface device 215 may, in some implementations, be further configured to initiate one or more handshaking protocols to facilitate the communication over the content sharing network 120. The handshaking protocols may allow the set top box 105 to communicate with and receive content from another set top box 105, for instance.

The device manager 220 may be configured to identify or discover at least one other set top box 105 able to communicate over the content sharing network 120 and able to receive content over the content provider network 115. The device manager 220 may be used for identifying which set top box 105 is to receive the streamed content or for finding which set top box 105 the media content will be received from. Moreover, the content provider network 115 may include telecommunication networks from different content providers. In other words, the set top boxes 105 may be used by subscribers of different content providers, and the device manager 220 may be able to identify set top boxes 105 associated with the same or different content providers yet able to communicate over the content sharing network 120.

The tuner discovery module 225 may be configured to determine whether any set top boxes 105 identified by the device manager 220 have at least one available tuner. As discussed above, an available tuner may be defined as a tuner 210 that is not currently in use because, e.g., the television connected to the set top box 105 is turned off, a user of the set top box 105 indicated that the tuner 210 is available, the set top box 105 is not using the tuner 210 to record media content or receive video-on-demand content, etc. The tuner discovery module 225 may be configured to determine whether any set top boxes 105 have an available tuner from messages transmitted from respective set top boxes 105. For instance, each set top box 105 may communicate over the content sharing network 120 that one or more tuners 210 are available for sharing. The tuner discovery module 225 may determine whether signals received at the network interface device 215 indicate that a tuner 210 of another set top box 105 is available. Alternatively or in addition, each set top box 105 may communicate when one or more tuners 210 become available to the content server 110 over either the content provider network 115 or the content sharing network 120. Alternatively or in addition the content server 110 can query the set top box 105 in real time to determine tuner availability. The tuner discovery module 225 may request a list of available tuners from the content server 110, or in some instances, the content server 110 may periodically send the list of available tuners to the set top box 105.

The processing device 230 may be configured to process signals received by the input device interface 200, the output device interface 205, the tuner 210, the network interface device 215, the device manager 220, and/or the tuner discovery module 225. The processing device 230 may be further configured to transmit, via the network interface device 215, account information to the content server 110 over the content provider network 115 or the content sharing network 120 and request media content to be streamed from an available tuner of another set top box 105. The processing device 230 may process the signals associated with streamed media content received by the network interface device 215 and output the processed signals to the output interface device. Moreover, the processing device 230 may process signals received via the input device interface 200 and output the processed signals to the network interface device 215 for transmission to the content server 110 or another set top box 105 or to the output device interface 205 for presentation to the user. The processing device 230 may be configured to process other signals as well such as signals from a user input turning on a television, turning off a television, changing a channel, changing the volume of the television, viewing a programming guide, controlling media content (pausing, rewinding, fast-forwarding, etc.), recording a program, searching for an available tuner of another set top box 105, searching for media content, and accessing Internet content.

Continuing with the example above where the set top box 105B is sending media content to the set top box 105A, the processing device 230 (of the set top box 105B) may be configured to prevent the media content from being displayed on an external device such as a television connected to the set top box 105B. This may be because the content is outside the scope of the subscription details associated with the set top box 105B or for privacy reasons. Instead of displaying the media content, the processing device 230 may cause the output device interface 205 to display a message indicating that the tuner 210 is being shared and is not currently available. The processing device 230 may further prompt the user to select whether the user wishes to stop sharing the tuner 210 or alternatively take over the tuner implicitly or unconditionally. As part of this takeover, the user of the set top box 105A may be informed that the streaming has stopped if another available streaming tuner on the network could not be found. Moreover, the processing device 230 may prohibit the customer using the set top box 105B from identifying who is receiving the media content through the set top box 105A, and vice versa.

The system 100 and components illustrated in FIGS. 1 and 2 and described above allow the content server 110 to identify which set top boxes 105 have at least one available tuner, receive a request from a first set top box 105A to access an available tuner of a second set top box 105B, look up account information associated with the first set top box 105A, provide media content to the available tuner of the second set top box 105B over the content provider network 115, check with set top box 105B to assure that a tuner is still available, and command the second set top box 105B to stream content to the first set top box 105A, in accordance with the account information associated with the first set top box 105A, over the content sharing network 120.

Figure 3:
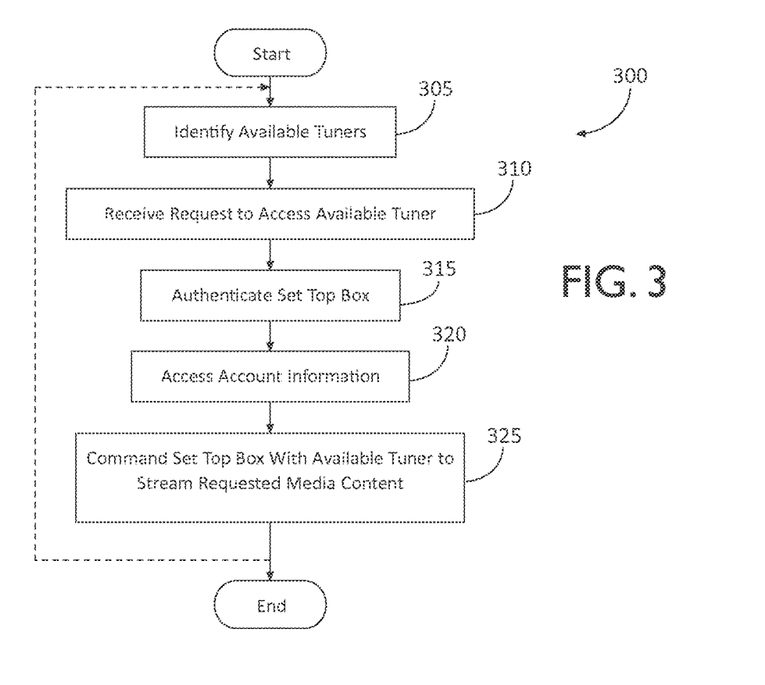
FIG. 3 illustrates a flowchart of an exemplary process that may be implemented by a server to initiate tuner sharing among set top boxes.

FIG. 3 is a flowchart of an exemplary process 300 that may be implemented in the content server 110 to allow data sharing between the tuners of two set top boxes 105.

At block 305, the content server 110 may identify which set top boxes 105 have available tuners. Each set top box 105 may tell the content server 110 when a tuner 210 is available for sharing either from a user input explicitly allowing tuner sharing or from a predetermined condition (e.g., at least one tuner 210 of the set top box 105 is not currently in use). This knowledge of tuner availability may be stored on the content database 125 or on the content server 110, or the set to box 105 may be queried by the content server 110 for tuner availability in real time.

At block 310, the content server 110 may receive a request, from one set top box 105A, to access a shared tuner of another set top box 105B. The request may or may not explicitly identify the set top box 105B with the shared tuner. That may be determined by the content server 110. The first and second set top boxes 105A, 105B may be assigned to the same or different customers of the same or different content providers. The content server 110 may receive the request from the first set top box 105A over the content provider network 115, the content sharing network 120, or another telecommunications network.

At block 315, the content server 110 may authenticate the first set top box 105A. The content server 110 may request certain information from the first set top box 105A. The information requested may include general account information or more specific information such as an identifier like a serial number of the first set top box 105A. Alternatively, the request sent at block 310 may include sufficient information for the content server 110 to authenticate the first set top box 105A. With the information, the content server 110 may determine which set top box 105 transmitted the request.

At block 320, the content server 110 may access the account information associated with the first set top box 105A. The account information may define, among other things, the subscription details which include the media content, such as channels, video-on-demand, etc., the first set top box 105A may access through the content provider network 115. The subscription details associated with the first set top box 105A may be different from the subscription details associated with the second set top box 105B.

At block 325, the content server 110 may command the second set top box 105B to stream content from the available tuner 210 to the first set top box 105A over the content sharing network 120. Since the subscription details for the first and second set top boxes 105A, 105B may be different, the content server 110 may permit the second set top box 105B to receive media content over the content provider network 115 that it would not ordinarily be able to receive locally (e.g., premium content, video-on-demand, etc.) if the subscription details of the first set top box 105A permit such media content.

The process 300 may end after block 325 or return to block 300.

Figure 4:
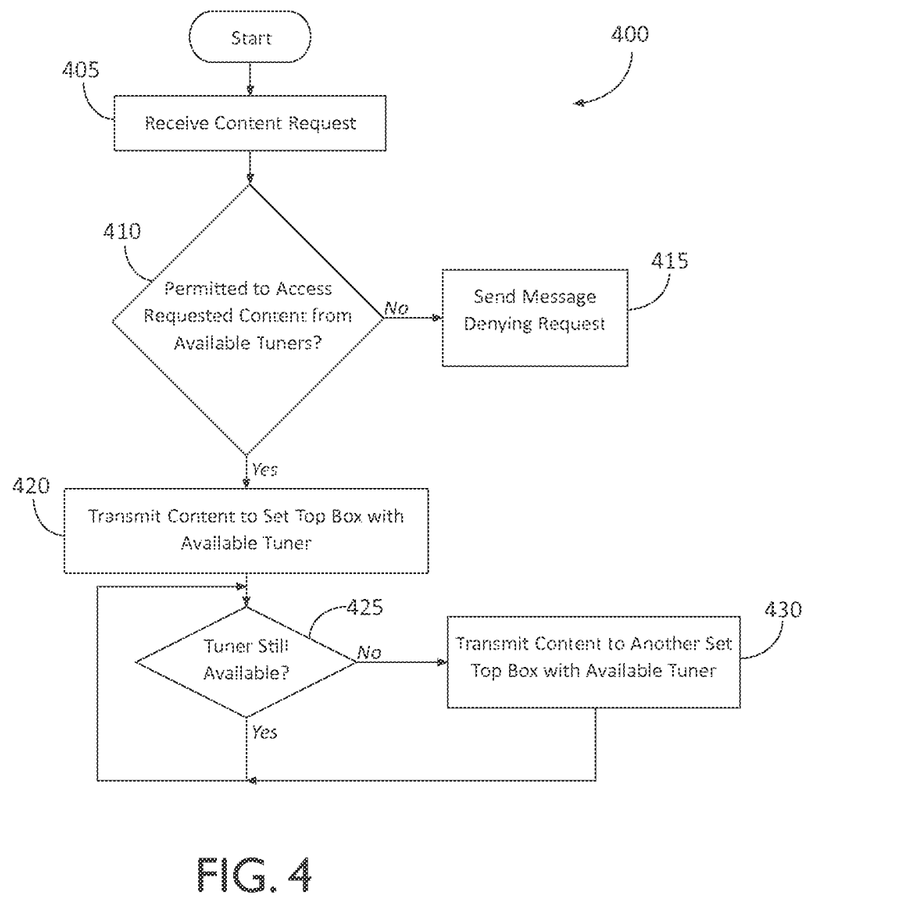
FIG. 4 illustrates a flowchart of an exemplary process that may be implemented by a server to provide content from the tuner of one set top box to another set top box.

FIG. 4 is a flowchart of an exemplary process 400 that may be implemented in the content server 110 to act as an intermediary between the first and second set top boxes 105A, 105B while the second set top box 105B is streaming content to the first set top box 105A over the content sharing network 120.

At block 405, the content server 110 may receive a request for media content from the first set top box 105A. The request may identify a particular television channel, video-on-demand content, game, a web address, etc. The request may be received over the content provider network 115, the content sharing network 120, or another telecommunications network. The first set top box 105A may transmit the request to the content server 110 or to the second set top box 105B in which case the second set top box 105B may forward the request to the content server 110.

At decision block 410, the content server 110 may determine whether the first set top box 105A is permitted to access or receive the requested media content from the second set top box 105B. If the requested media content is outside the scope of the subscription details associated with the first set top box 105A, and a tuner is available on the second set top box 105B, the process 400 may continue at block 415. If the requested media content is within the scope of the subscription details associated with the first set top box 105A, the process 400 may continue at block 420.

At block 415, the content server 110 may deny the request and send an asynchronous message to the first set top box 105A indicating that the requested media content is outside the scope of the subscription. The message may further prompt the user to select different content (e.g., content within the scope of the subscription) or to contact the service provider to upgrade the service associated with the first set top box 105A. The process 400 may then continue at block 405.

At block 420, the content server 110 may transmit the media content requested at block 405 to the available decoder of the tuner of the second set top box 105B. The media content may be delivered to the second set top box 105B over the content provider network 115. In some instances, the second set top box 105B may be prevented from displaying the content on a television or another type of output device connected to the second set top box 105B, especially if the requested media content may be outside the scope of the subscription details of the second set top box 105B or for purposes of privacy and anonymity. Upon receipt, the second set top box 105B may begin streaming the requested media content to the first set top box 105A via the content sharing network 120.

At decision block 425, the content server 110 may determine whether the tuner 210 of the second set top box 105B is still available for sharing. Reasons that the tuner 210 may become unavailable may include a user input provided to the second set top box 105B that denies sharing the tuner 210 or upon occurrence of a predetermined condition indicating that the tuner 210 is no longer available (e.g., the tuner 210 is needed to view or record media content for the customer of the second set top box 105B). The content server 110 may determine that the shared tuner has become unavailable based on a message received from the second set top box 105B. If the shared tuner becomes unavailable, the process 400 may continue at block 430. While the shared tuner is available, the process 400 may periodically repeat block 425 until the shared tuner becomes unavailable or until the first set top box 105A no longer needs to stream content from the shared tuner 210 of the second set top box 105B.

At block 430, the content server 110 may identify another available tuner so that the requested media content can be provided to the first set top box 105A through another available tuner on another set top box 105. For instance, the content server 110 may identify that the third set top box 105C has an available tuner and command the third set top box 105C to provide the media content requested at block 405. For purposes of redundancy, the content server 110 may send the requested media content to the tuner 210 of the third set top box 105C even when the second set top box 105B is still available. This way, if the second set top box 105B becomes unavailable unexpectedly, the content server 110 may automatically command the third set top box 105C to stream the content to the first set top box 105A via the content sharing network 120 with minimal or no interruption relative to the customer of the first set top box 105A.

Figure 5:
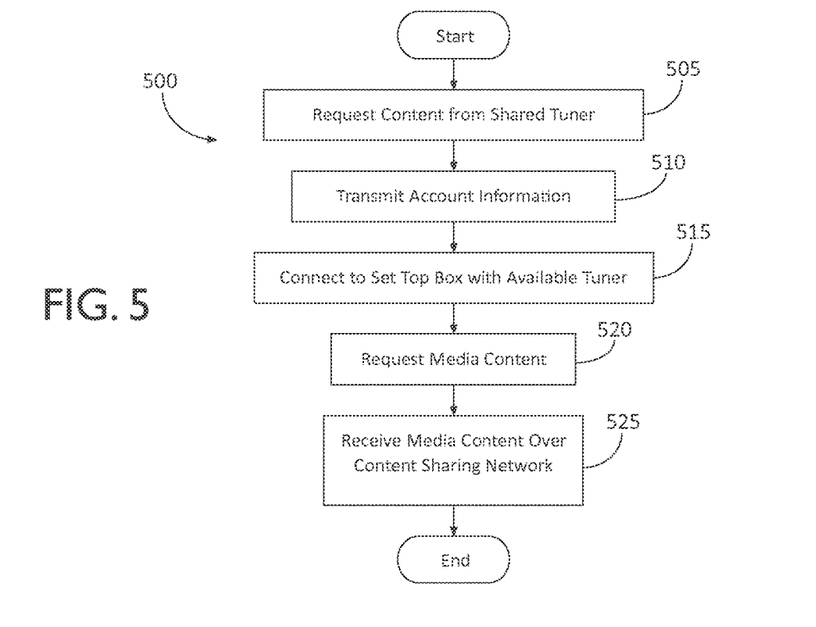
FIG. 5 illustrates a flowchart of an exemplary process that may be implemented by one or more of the set top boxes of FIG. 1.

FIG. 5 is a flowchart of an exemplary process 500 that may be implemented by the first set top box 105A to receive media content over the content sharing network 120.

At block 505, the set top box 105A may send a message to the content server 110 requesting content from a shared tuner. The message may include a request for the content server 110 to identify which set top boxes 105 are capable of streaming media content over the content sharing network 120 that have an available tuner to offer. The message may be generated by the processing device 230 and transmitted to the content server 110 via the network interface device 215.

At block 510, the set top box 105A may transmit account information to the content server 110. The account information may include sufficient information for the content server 110 to identify the set top box 105A and the account information associated with the set top box 105A. The message containing the account information may be generated by the processing device 230 and transmitted to the content server 110 over the content provider network 115, the content sharing network 120, or any other telecommunications network, via the network interface device 215.

At block 515, the set top box 105A may recognize and connect to one of the set top boxes 105 (such as the set top box 105B) identified by the content server 110 as having an available tuner. The connection may be made via, e.g., the content sharing network 120. Alternatively, the set top box 105A may be able to find other set top boxes 105B, 105C with available tuners with no or minimal assistance from the content server 110. For instance, the device manager 220 may identify one or more set top boxes 105B and 105C that are able to communicate over the content sharing network 120 and the tuner discovery module 225 may determine which, if any, of the set top boxes 105B and 105C discovered by the device manager 220 have an available tuner. The network interface device 215 may establish a communication session with one of the set top boxes 105B and 105C having an available tuner.

At block 520, the set top box 105A may transmit a request for media content to the content server 110. The request may specify that the media content is to be streamed from the available tuner of one or both of the set top boxes 105B, 105C identified at block 515. The request may be generated by the processing device 230 and transmitted to the content server 110 via the network interface device 215. Moreover, the request may be transmitted over the content provider network 115, the content sharing network 120, or another telecommunications network. Before providing the requested media content, the content server 110 may authenticate the account information of the set top box 105A to confirm that the requested media content is permitted by the subscription details associated with the set top box 105A.

At block 525, the set top box 105A may receive the media content requested at block 520 via the content sharing network 120. The media content may be received via the network interface device 215, processed by the processing device 230, and output to a television or other display device via the output device interface 205. The set top box 105A may continue to receive the requested media content until the shared tuner is no longer available (unless another tuner 210 is available as discussed above) or until the customer no longer wishes to view the requested media content. The customer may indicate a preference to no longer view the requested media content by turning off his or her television or other output device, by requesting different media content, or by viewing the content provided to one of the tuners 210 of the set top box 105A.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising: a computing device having a memory and a processor, wherein the processor is programmed to:
    identify at least one available tuner associated with at least one of a plurality of set top boxes in communication with the computing device, the plurality of set top boxes including at least a first set top box and a second set top box;
    receive a request from the first set top box to access content via an available tuner of the second set top box;
    determine a sharing preference associated with the shared use of the available tuner of the second set top box;
    access account information associated with the first set top box;
    determine, from the account information associated with the first set top box, that the first set top box is authorized to receive the content requested by the first set top box; and
    in response to determining that the account information authorizes the first set top box to receive the requested content, command the second set top box to stream the requested content from the available tuner of the second set top box to the first set top box according to the sharing preference associated with the shared use of the available tuner of the second set top box.

2. The system of claim 1, wherein the account information associated with the first set top box is different from account information associated with the second set top box, and wherein the computing device is programmed to prevent the second set top box from displaying the requested content streamed to the first set top box on a display device connected to the second set top box if the account information associated with the second set top box does not authorize the second set top box to receive the requested content.

3. The system of claim 1, wherein the first set top box is assigned to a first user and the second set top box is assigned to a second user.

4. The system of claim 1, wherein the computing device is configured to receive a content request from the first set top box and transmit the content request to the second set top box if the content request is permitted by the account information associated with the first set top box and sharing preferences on the first and second set top boxes are enabled, and
wherein the processor is programmed to command the second set top box to transition the available tuner from an idle state to a non-idle state in response to receiving the content request from the first set top box.

5. The system of claim 1, further comprising:
an account database storing the account information, wherein the computing device is configured to query the account database for the account information.

6. The system of claim 1, wherein the computing device is configured to stop streaming content from the second set top box to the first set top box when no tuner of the second is available, or when the first set top box no longer can provide the content without the tuner of the second set top box.

7. The system of claim 6, wherein the computing device is configured to:
identify a third set top box as having an available tuner, and
command the third set top box to stream content from the available tuner of the third set top box to the first set top box when no tuner of the second set top box is available.

8. The system of claim 1, wherein the computing device is configured to receive a signal from the second set top box indicating that at least one tuner of the second set top box is an available tuner.

9. The system of claim 8, wherein the computing device is configured to receive the signal indicating that at least one tuner of the second set top box is an available tuner in response to a predetermined condition of the second set top box or in response to a query from the computing device.

10. The system of claim 8, wherein the computing device is configured to receive the signal indicating that at least one tuner of the second set top box is an available tuner in response to a user input provided to the second set top box.

11. The system of claim 1, wherein the computing device is configured to determine a period of time for which the available tuner of the second set top box will be available.

12. The system of claim 1, wherein the computing device is configured to receive a user input provided to the second set top box preventing streaming the content from the available tuner of the second set top box to the first set top box.

13. A method comprising:
identifying at least one available tuner associated with at least one of a plurality of set top boxes in communication with the server, the plurality of set top boxes including at least a first set top box and a second set top box assigned to different users;
receiving a request from the first set top box to access content from one of the available tuners of the second set top box;
determining a sharing preference associated with shared use of the available tuner of the second set top box;
accessing account information associated with the first set top box;
determining, from the account information associated with the first set top box, that the first set top box is authorized to receive the content requested by the first set top box; and
in response to determining that the account information authorizes the first set top box to receive the requested content, commanding the second set top box to stream the requested content from one of the available tuners of the second set top box to the first set top box according to the sharing preference associated with the shared use of the available tuner of the second set top box.

14. The method of claim 13, wherein the account information associated with the first set top box is different from account information associated with the second set top box, and the method further comprising preventing the second set top box from displaying the content streamed to the first set top box on a display device connected to the second set top box if the account information associated with the second set top box does not authorize the second set top box to receive the requested content.

15. The method of claim 13, further comprising:
receiving a content request from the first set top box;
commanding the second set top box to transition the available tuner from an idle state to a non-idle state in response to receiving the content request from the first set top box; and
transmitting the content request to the second set top box if the content request is permitted by the account information associated with the first set top box.

16. The method of claim 13, further comprising determining whether one of the available tuners of the second set top box has become unavailable.

17. The method of claim 16, further comprising:
identifying a third set top box as having an available tuner; and
commanding the third set top box to stream content from the available tuner of the third set top box to the first set top box when one of the available tuners of the second set top box becomes unavailable.

18. The method of claim 13, further comprising receiving a signal from the second set top box indicating that at least one of the tuners of the second set top box is an available tuner based on a predetermined condition of the set top box or in response to a user input provided to the set top box.

19. A first set top box comprising:
a device manager configured to identify a second set top box configured to receive content over a communication network;
a tuner discovery module configured to determine whether the second set top box has an available tuner; and
a processing device configured to transmit account information to a service provider over the communication network and request content to be streamed from the available tuner of the second set top box, wherein the account information is associated with the first set top box and indicates that the first set top box is authorized to receive the requested content from the second set top box; and
a network interface device configured to receive the content streamed from the available tuner of the second set top box, wherein the content is streamed from the available tuner of the second set top box according to the account information transmitted by the processing device and in accordance with a sharing preference associated with shared use of the available tuner of the other set top box.

20. The first set top box of claim 19, wherein the tuner discovery module is configured to determine whether the second set top box has an available tuner based on a list of available tuners received from the content server.

* * * * *